(12) United States Patent
Swanson et al.

(10) Patent No.: US 9,050,788 B2
(45) Date of Patent: Jun. 9, 2015

(54) UNIVERSAL ADAPTER FOR CONSUMABLE ASSEMBLY USED WITH ADDITIVE MANUFACTURING SYSTEM

(75) Inventors: William J. Swanson, St. Paul, MN (US); Dominic F. Mannella, Minnetonka, MN (US)

(73) Assignee: Stratasys, Inc., Eden Prairie, MN (US)

( * ) Notice: Subject to any disclaimer, the term of this patent is extended or adjusted under 35 U.S.C. 154(b) by 358 days.

(21) Appl. No.: 13/334,934

(22) Filed: Dec. 22, 2011

(65) Prior Publication Data
US 2013/0164960 A1    Jun. 27, 2013

(51) Int. Cl.
| | | |
|---|---|---|
| *A23G 1/22* | (2006.01) |
| *A23G 3/12* | (2006.01) |
| *A23G 3/16* | (2006.01) |
| *A23P 1/00* | (2006.01) |
| *B21C 3/00* | (2006.01) |
| *B23B 19/00* | (2006.01) |
| *B23B 23/00* | (2006.01) |
| *B29C 41/02* | (2006.01) |

(52) U.S. Cl.
CPC *B33Y 30/00* (2014.12); *B29C 41/02* (2013.01)

(58) Field of Classification Search
USPC ..................................... 425/66, 97
See application file for complete search history.

(56) References Cited

U.S. PATENT DOCUMENTS

| | | |
|---|---|---|
| 2,767,938 A | 10/1956 | Taylor, Jr. |
| 3,877,661 A | 4/1975 | Newman |
| 4,160,533 A | 7/1979 | Kotzur et al. |
| 4,162,050 A | 7/1979 | Wagner et al. |
| 4,367,853 A | 1/1983 | Kotzur |
| 4,406,419 A | 9/1983 | Kotzur |
| 4,523,723 A | 6/1985 | Kotzur |
| 4,741,495 A | 5/1988 | Kotzur |
| 4,749,347 A | 6/1988 | Valavaara |
| 5,079,899 A | 1/1992 | Kurachi |
| 5,121,329 A | 6/1992 | Crump |
| 5,303,141 A | 4/1994 | Batchelder et al. |
| 5,312,224 A | 5/1994 | Batchelder et al. |
| 5,340,433 A | 8/1994 | Crump |
| 5,426,722 A | 6/1995 | Batchelder |
| 5,470,026 A | 11/1995 | Kotzur |
| 5,503,785 A | 4/1996 | Crump et al. |
| 5,653,925 A | 8/1997 | Batchelder |
| 5,738,817 A | 4/1998 | Danforth et al. |
| 5,764,521 A | 6/1998 | Batchelder et al. |

(Continued)

FOREIGN PATENT DOCUMENTS

WO    WO 2009088995 A1    7/2009

OTHER PUBLICATIONS

International Search Report and Written Opinion dated Mar. 20, 2013 from International Application No. PCT/US2012/070608.

(Continued)

*Primary Examiner* — Stephen Meier
*Assistant Examiner* — Renee I Wilson
(74) *Attorney, Agent, or Firm* — Westman, Champlin & Koehler, P.A.

(57) ABSTRACT

A universal adapter for use with a consumable assembly that is configured for use with an additive manufacturing system, the universal adapter comprising an inlet opening configured to receive a guide tube of the consumable assembly, and a connection member at the outlet end, which is configured interface with a mating panel of the additive manufacturing system.

20 Claims, 16 Drawing Sheets

(56) References Cited

U.S. PATENT DOCUMENTS

| | | |
|---|---|---|
| 5,866,058 A | 2/1999 | Batchelder et al. |
| 5,939,008 A | 8/1999 | Comb et al. |
| 5,968,561 A | 10/1999 | Batchelder et al. |
| 5,979,812 A | 11/1999 | Kotzur et al. |
| 6,004,124 A | 12/1999 | Swanson et al. |
| 6,022,207 A | 2/2000 | Dahlin et al. |
| 6,028,410 A | 2/2000 | Leavitt et al. |
| 6,054,077 A | 4/2000 | Comb et al. |
| 6,067,480 A | 5/2000 | Stuffle et al. |
| 6,070,107 A | 5/2000 | Lombardi et al. |
| 6,085,957 A | 7/2000 | Zinniel et al. |
| 6,086,012 A | 7/2000 | Kotzur et al. |
| 6,109,554 A | 8/2000 | Kotzur et al. |
| 6,129,872 A | 10/2000 | Jang |
| 6,228,923 B1 | 5/2001 | Lombardi et al. |
| 6,250,735 B1 | 6/2001 | Kaneko et al. |
| 6,341,741 B1 | 1/2002 | Kotzur et al. |
| 6,547,995 B1 | 4/2003 | Comb |
| 6,629,011 B1 | 9/2003 | Calderon et al. |
| 6,645,412 B2 | 11/2003 | Priedeman, Jr. |
| 6,685,866 B2 | 2/2004 | Swanson et al. |
| 6,702,213 B2 | 3/2004 | Kotzur et al. |
| 6,722,872 B1 | 4/2004 | Swanson et al. |
| 6,749,414 B1 | 6/2004 | Hanson et al. |
| 6,776,602 B2 | 8/2004 | Swanson et al. |
| 6,790,403 B1 | 9/2004 | Priedeman, Jr. et al. |
| 6,814,907 B1 | 11/2004 | Comb |
| 6,866,807 B2 | 3/2005 | Comb et al. |
| 6,869,559 B2 | 3/2005 | Hopkins |
| 6,923,634 B2 | 8/2005 | Swanson et al. |
| 6,998,087 B1 | 2/2006 | Hanson et al. |
| 7,063,285 B1 | 6/2006 | Turley et al. |
| 7,122,246 B2 | 10/2006 | Comb et al. |
| 7,169,337 B2 | 1/2007 | Swanson et al. |
| 7,172,715 B2 | 2/2007 | Swanson et al. |
| 7,249,726 B2 | 7/2007 | Kotzur |
| 7,297,304 B2 | 11/2007 | Swanson et al. |
| 7,309,038 B2 | 12/2007 | Carroscia |
| 7,314,591 B2 | 1/2008 | Priedeman, Jr. |
| 7,329,128 B1 | 2/2008 | Awad |
| 7,341,214 B2 | 3/2008 | Taatjes et al. |
| 7,384,255 B2 | 6/2008 | LaBossiere et al. |
| 7,604,470 B2 | 10/2009 | LaBossiere et al. |
| 7,625,200 B2 | 12/2009 | Leavitt |
| 7,938,351 B2 | 5/2011 | Taatjes et al. |
| 2005/0173838 A1 | 8/2005 | Priedeman et al. |
| 2005/0194781 A1 | 9/2005 | Tiberghien et al. |
| 2007/0228590 A1 | 10/2007 | LaBossiere et al. |
| 2007/0228592 A1 | 10/2007 | Dunn et al. |
| 2008/0169585 A1 | 7/2008 | Zinniel |
| 2009/0035405 A1 | 2/2009 | Leavitt |
| 2009/0263582 A1 | 10/2009 | Batchelder |
| 2009/0273122 A1 | 11/2009 | Batchelder et al. |
| 2009/0274540 A1 | 11/2009 | Batchelder et al. |
| 2010/0021580 A1 | 1/2010 | Swanson et al. |
| 2010/0096072 A1 | 4/2010 | Hopkins et al. |
| 2010/0096485 A1 | 4/2010 | Taatjes et al. |
| 2010/0096489 A1 | 4/2010 | Taatjes et al. |
| 2010/0100224 A1 | 4/2010 | Comb et al. |
| 2010/0283172 A1 | 11/2010 | Swanson |
| 2010/0327479 A1 | 12/2010 | Zinniel et al. |
| 2011/0074065 A1 | 3/2011 | Batchelder et al. |
| 2011/0076495 A1 | 3/2011 | Batchelder et al. |
| 2011/0076496 A1 | 3/2011 | Batchelder et al. |
| 2011/0117268 A1 | 5/2011 | Batchelder et al. |
| 2011/0121476 A1 | 5/2011 | Batchelder et al. |
| 2011/0233804 A1 | 9/2011 | Batchelder et al. |
| 2012/0018924 A1 | 1/2012 | Swanson et al. |
| 2012/0068378 A1 | 3/2012 | Swanson et al. |
| 2012/0070523 A1 | 3/2012 | Swanson et al. |
| 2012/0164256 A1 | 6/2012 | Swanson et al. |
| 2013/0161432 A1 | 6/2013 | Mannella et al. |
| 2013/0161439 A1 | 6/2013 | Beery et al. |
| 2013/0161442 A1 | 6/2013 | Mannella et al. |

OTHER PUBLICATIONS

Brochure, Reelex Packaging Guide, Guidelines and Recommendations, Reelex Packaging Solutions, Inc., May 2010.

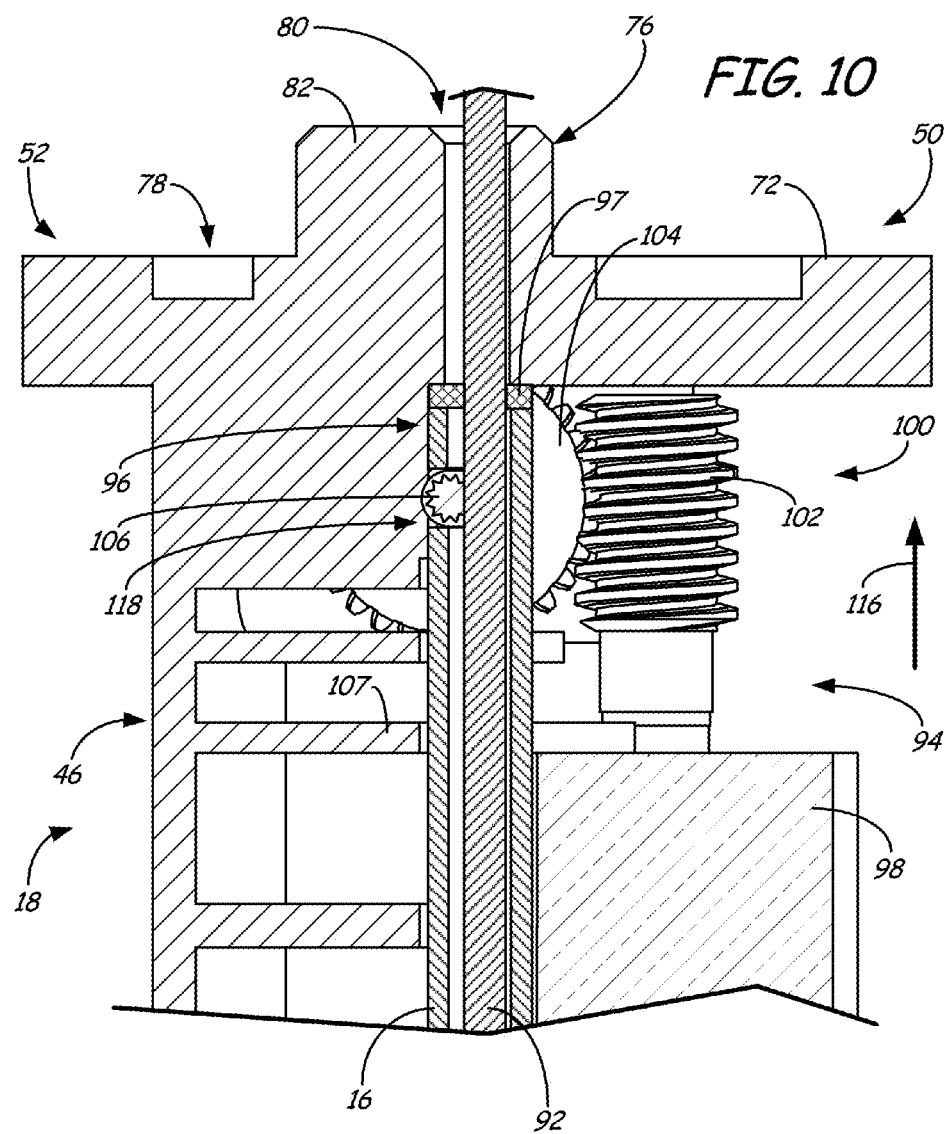

UNIVERSAL ADAPTER FOR CONSUMABLE ASSEMBLY USED WITH ADDITIVE MANUFACTURING SYSTEM

BACKGROUND

The present disclosure relates to additive manufacturing systems for building three-dimensional (3D) parts with layer-based, additive manufacturing techniques. In particular, the present disclosure relates to consumable assemblies for supplying consumable part and support materials to additive manufacturing systems.

Additive manufacturing systems are used to print or otherwise build 3D parts from digital representations of the 3D parts (e.g., AMF and STL format files) using one or more additive manufacturing techniques. Examples of commercially available additive manufacturing techniques include extrusion-based techniques, jetting, selective laser sintering, powder/binder jetting, electron-beam melting, and stereolithographic processes. For each of these techniques, the digital representation of the 3D part is initially sliced into multiple horizontal layers. For each sliced layer, a tool path is then generated, which provides instructions for the particular additive manufacturing system to print the given layer.

For example, in an extrusion-based additive manufacturing system, a 3D part may be printed from a digital representation of the 3D part in a layer-by-layer manner by extruding a flowable part material. The part material is extruded through an extrusion tip carried by a print head of the system, and is deposited as a sequence of roads on a substrate in an x-y plane. The extruded part material fuses to previously deposited part material, and solidifies upon a drop in temperature. The position of the print head relative to the substrate is then incremented along a z-axis (perpendicular to the x-y plane), and the process is then repeated to form a 3D part resembling the digital representation.

In fabricating 3D parts by depositing layers of a part material, supporting layers or structures are typically built underneath overhanging portions or in cavities of 3D parts under construction, which are not supported by the part material itself. A support structure may be built utilizing the same deposition techniques by which the part material is deposited. The host computer generates additional geometry acting as a support structure for the overhanging or free-space segments of the 3D part being formed. Support material is then deposited from a second nozzle pursuant to the generated geometry during the printing process. The support material adheres to the part material during fabrication, and is removable from the completed 3D part when the printing process is complete.

SUMMARY

An aspect of the present disclosure is directed to a universal adapter for use with a consumable assembly that is configured for use with an additive manufacturing system having a print head and a mating panel that is disposed at remote location from a print head. The universal adapter includes an adapter housing having an inlet end and an outlet end, and an inlet opening at the inlet end configured to receive a guide tube of the consumable assembly. The universal adapter also includes a connection member at the outlet end, which is configured interface with the mating panel. The connection member includes a coupling mechanism configured to secure the connection member to the mating panel, and an outlet orifice configured to engage a reciprocating opening of the mating panel.

Another aspect of the present disclosure is directed to a consumable assembly for use with an additive manufacturing system having a print head and a mating panel that is disposed at remote location from a print head. The consumable assembly includes a container portion having a supply of a consumable filament, a flexible guide tube having a first end disposed in the container portion and a second end, and a universal adapter. The universal adapter includes an inlet opening through which the second end of the guide tube extends, and a coupling mechanism configured to secure the universal adapter to the mating panel. The universal adapter also includes an outlet orifice configured to engage a reciprocating opening of the mating panel, and a filament drive mechanism engaged with a segment of the consumable filament that is fed from the container portion, through the guide tube, and into the universal adapter.

Another aspect of the present disclosure is directed to a method for delivering a consumable filament from a consumable assembly to a print head of an additive manufacturing system. The method includes interfacing a universal adapter with a mating panel of the additive manufacturing system, which engages an outlet orifice of the universal adapter with a reciprocating opening of the mating panel in a sealed manner, and which engages a first electrical contact of the universal adapter with a second electrical contact of the mating panel. The method also includes relaying data from a data storage medium of the universal adapter to the additive manufacturing system, and receiving electrical power from the additive manufacturing system across the second electrical contact of the mating panel to the first electrical contact of the universal adapter. The method further includes relaying the electrical power from the first electrical contact to a filament drive mechanism of the universal adapter, and operating the filament drive mechanism with the electrical power to drive the consumable filament through the outlet orifice of the universal adapter and into the reciprocating opening of the mating panel.

BRIEF DESCRIPTION OF THE DRAWINGS

FIG. 10 is an expanded sectional view of a second alternative design for the universal adapter, which includes an extended guide tube with a ported opening.

DETAILED DESCRIPTION

The present disclosure is directed to a consumable assembly having a universal adapter for use with additive manufacturing systems, such as extrusion-based additive manufacturing systems. The consumable assembly also includes a container portion configured to retain a supply of a consumable filament (e.g., a coil or spool). The universal adapter is configured to interface with a reciprocating mating panel of an additive manufacturing system to feed successive segments of the consumable filament to the additive manufacturing system. As discussed below, the universal adapter may interchangeably interface with different additive manufacturing systems, each having a reciprocating mating panel. This allows a single consumable assembly to be used with different models of additive manufacturing systems. Additionally, the universal adapter also allows the consumable assembly to effectively have a container portion of any desired size, and is not limited to the dimensions of bay slots.

Figure 1:
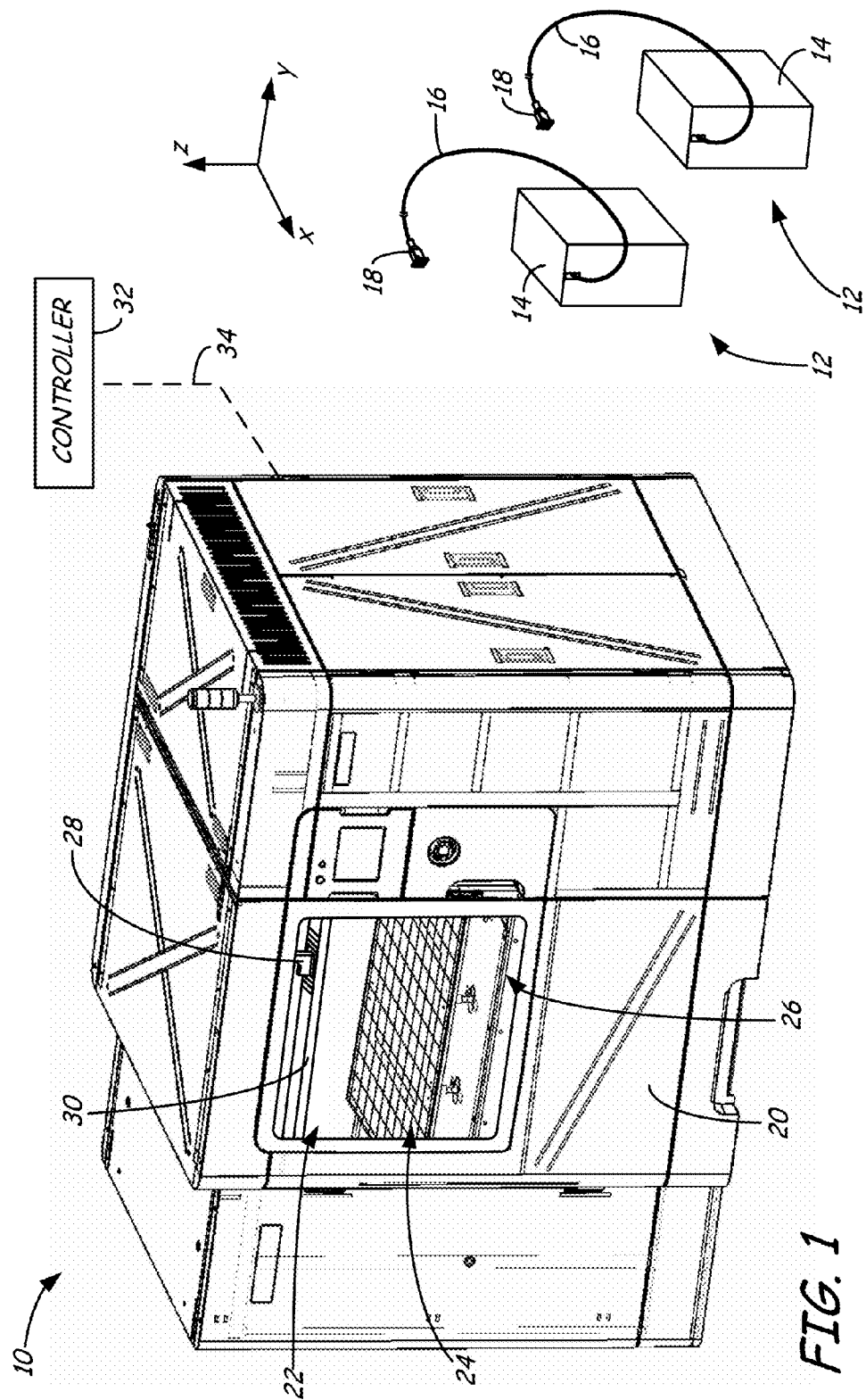
FIG. 1 is a top, front perspective view of an additive manufacturing system in use with consumable assemblies that incorporate universal adapters of the present disclosure.

FIG. 1 shows system 10 in use with two consumable assemblies 12 of the present disclosure, where each consumable assembly 12 is a replaceable container device that retains a supply of consumable filament for printing with system 10. Typically, one of the consumable assemblies 12 contains a supply of part material filament ("part material consumable assembly"), and the other consumable assembly 12 contains a supply of support material filament ("support material consumable assembly"). However, both consumable assemblies 12 may be identical in structure.

In the shown embodiment, each consumable assembly 12 includes container portion 14, guide tube 16, and universal adapter 18, where container portion 14 retains a supply of a consumable filament. Guide tube 16 interconnects container portion 14 and universal adapter 18 to supply successive segments of the consumable filament from container portion 14 to universal adapter 18.

System 10 is an additive manufacturing system for printing 3D parts or models and corresponding support structures from the part and support material filaments, respectively, of consumable assemblies 12, using a layer-based, additive manufacturing technique. Suitable additive manufacturing systems for system 10 include extrusion-based systems developed by Stratasys, Inc., Eden Prairie, Minn. under the trademarks "FDM" and "FUSED DEPOSITION MODELING".

Universal adapter 18 may be interchangeably connected to any suitable additive manufacturing system that includes a reciprocating mating panel. As such, the same consumable assembly 12 may be universally used with large production systems (e.g., those available under the trademark "FORTUS" from Stratasys, Inc., Eden Prairie, Minn.), with office-friendly 3D printers (e.g., those available under the trademarks "DIMENSION" and "uPRINT" from Stratasys, Inc., Eden Prairie, Minn.), and even with smaller additive manufacturing systems, such as those disclosed in Swanson et al., U.S. Publication No. 2012/0164256.

As shown, system 10 includes system casing 20, build chamber 22, platen 24, platen gantry 26, print head 28, and head gantry 30. System casing 20 is a structural component of system 10 and may include multiple structural sub-components such as support frames, housing walls, and the like. In the shown embodiment, system casing 20 defines the dimensions of build chamber 22.

Build chamber 22 is an enclosed environment that contains platen 24 for printing 3D parts and support structures. Build chamber 22 may be heated (e.g., with circulating heated air) to reduce the rate at which the part and support materials solidify after being extruded and deposited (e.g., to reduce distortions and curling). In alternative embodiments, build chamber 22 may be omitted and/or replaced with different types of build environments. For example, a 3D part and support structure may be built in a build environment that is open to ambient conditions or may be enclosed with alternative structures (e.g., flexible curtains).

Platen 24 is a platform on which the 3D part and support structure are printed in a layer-by-layer manner, and is supported by platen gantry 26. In some embodiments, platen 24 may also include a flexible polymeric film or liner on which the 3D part and support structure are printed. Platen gantry 26 is a gantry assembly configured to move platen 24 along (or substantially along) the vertical z-axis.

Print head 28 is a unit configured to receive the consumable filaments from consumable assemblies 12, and is supported by head gantry 30. Examples of suitable devices for print head 28, and the connections between print head 28 and head gantry 30 include those disclosed in Leavitt et al., U.S. Pat. No. 7,625,200; Comb et al., U.S. Patent Application Publication No. 2010/0100224; and Swanson et al., U.S. Publication No. 2012/0614256. Head gantry 30 is a gantry assembly configured to move print head 28 in (or substantially in) a horizontal x-y plane above build chamber 22.

System 10 also includes controller 32, which is one or more processor-based controllers that may communicate over communication line 34 with universal adapters 18, build chamber 22 (e.g., with a heating unit for build chamber 22), print head 28, and various sensors, calibration devices, display devices, and/or user input devices. In some embodiments, controller 32 may also communicate with one or more of platen 24, platen gantry 26, head gantry 30, and any other suitable component of system 10.

While illustrated as a single signal line, communication line 34 may include one or more electrical, optical, and/or wireless signal lines, allowing controller 32 to communicate with various components of system 10. Furthermore, while illustrated outside of system 10, controller 32 and communication line 34 may be internal components to system 10.

During operation, controller 32 directs platen gantry 26 to move platen 24 to a predetermined height within build chamber 22. Controller 32 then directs head gantry 30 to move print head 28 around in the horizontal x-y plane above build chamber 22. Controller 32 may also direct universal adapters 18 and/or print head 28 to selectively draw successive segments of the consumable filaments from container portions 14, through guide tubes 16 and universal adapters 18, and to print head 28, as discussed below.

Print head 28 thermally melts the successive segments of the received consumable filaments such that they becomes molten materials, thereby allowing the molten materials to be extruded and deposited onto platen 24 for printing a 3D part and support structure in a layer-by-layer manner. After the print operation is complete, the resulting 3D part and support structure may be removed from build chamber 22, and the support structure may be removed from the 3D part. The 3D part may then undergo one or more additional post-processing steps.

Figure 2:
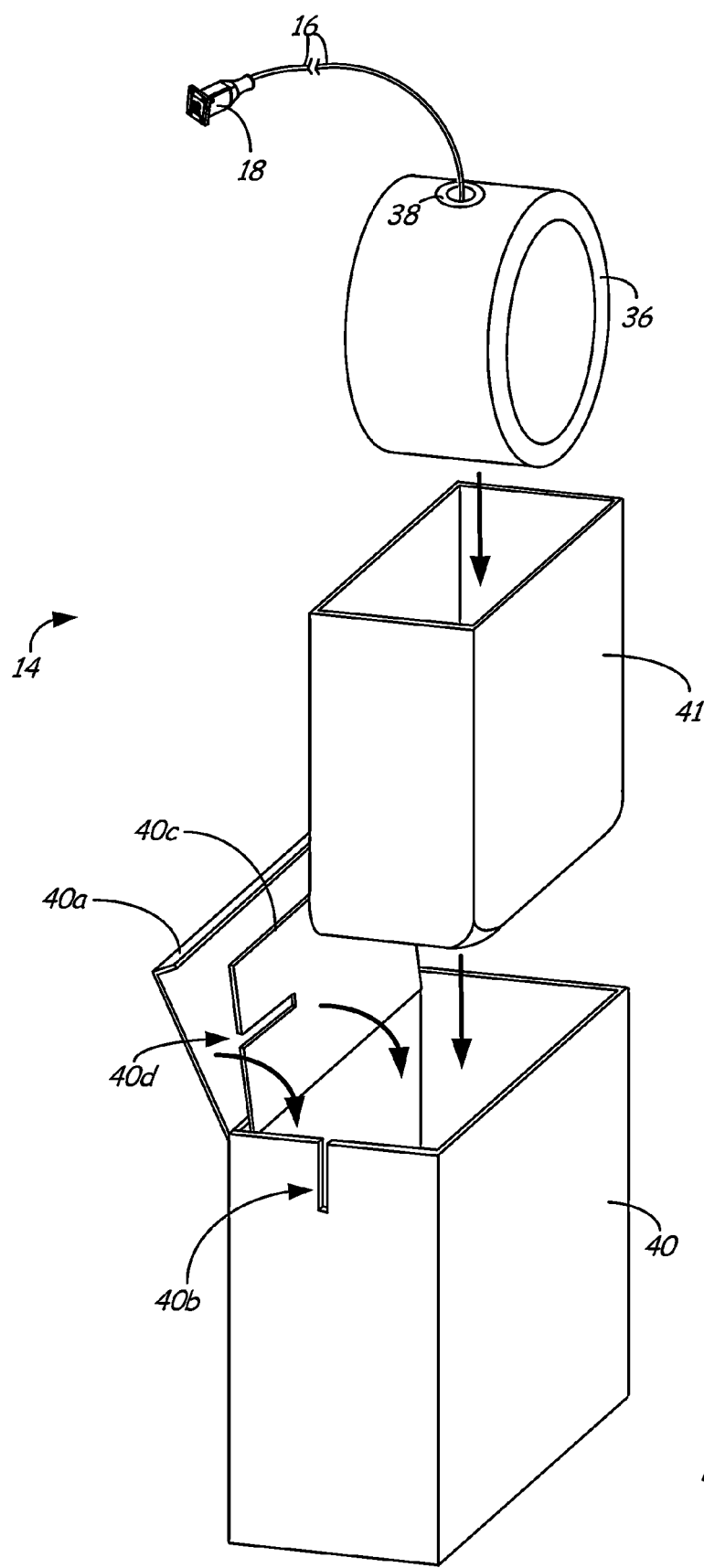
FIG. 2 is a top perspective view of one of the of the consumable assemblies, which includes a coil of a consumable filament, a payout tube, and a universal adapter of the present disclosure.
Figure 3:
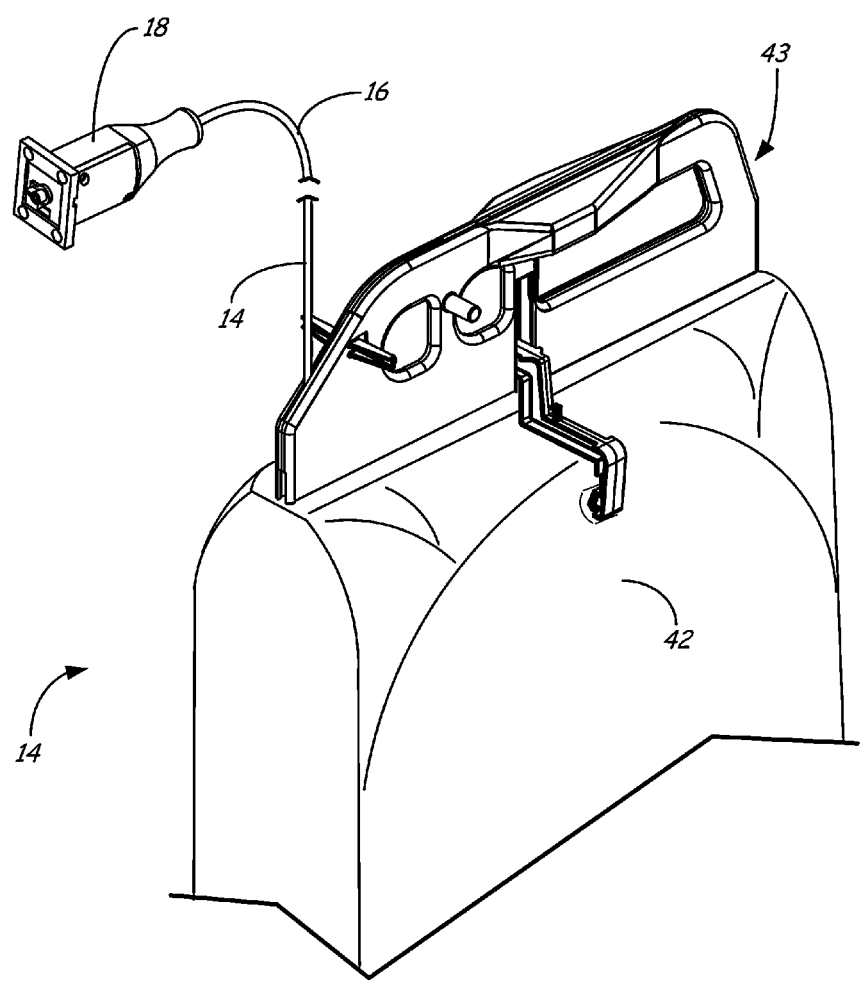
FIG. 3 is a top perspective view of an alternative consumable assembly, which includes a spooled consumable filament and the universal adapter of the present disclosure.

FIGS. 2 and 3 illustrate example embodiments for each consumable assembly 12. As shown in FIG. 2, container portion 14 includes coil 36 of the consumable filament retained in a figure-8 configuration. In this embodiment, the leading end of guide tube 16 is secured to payout tube 38, retained in a payout hole of coil 36, as disclosed in U.S. Publication No. 2013/0161432. The trailing end of guide tube 16 is accordingly secured within universal adapter 18.

During storage and transportation, universal adapter 18, coil 36, and payout tube 38 may be retained in box 40. Additionally, coil 36 and payout tube 38 are desirably sealed within liner 41, which itself is retained within box 40. When sealed, liner 41 prevents or substantially prevents ambient conditions from reaching the consumable filament of coil 36 (e.g., a moisture-impermeable barrier). The opposing ends of guide tube 16 are also desirably sealed to payout tube 38 within liner 41 and to universal adapter 18, respectively, to maintain the barrier against ambient conditions during transportation, storage, and use with system 10. As such, guide tube 16 extends out of liner 41, desirably in a sealed manner. One or more desiccant packets may also be stored within liner 41, such between the outer layer of coil 36 and liner 41.

In the shown example, box 40 includes lid 40a, external slot 40b, and internal shelf 40c, where internal shelf 40c includes slot 40d. After coil 36 is sealed within liner 41, the resulting coil 36/liner 41 may be inserted into box 40. Shelf 40c may then be closed over the retained coil 36/liner 41, and guide tube 16 may extend through slot 40d such that the trailing end of guide tube 16 and universal adapter 18 may be stored above shelf 40c. Optionally, shelf 40c may be secured in the closed position to protect the retained coil 36/liner 41. Lid 40a may then be closed for storage and transportation.

During use with system 10, a user may open lid 40a and remove universal adapter 18 from box 40, where guide tube 16 may also be inserted through external slot 40b. Lid 40a may then be closed again, and universal adapter 18 may be interfaced with a reciprocating mating panel of system 10, as discussed below. Accordingly, coil 36 may remain sealed in liner 41, and retained in box 40 below shelf 40c during all stages of transportation, storage, and use.

FIG. 3 illustrates an embodiment in which container portion 14 retains a spooled supply of the consumable filament, such as disclosed in U.S. Publication No. 2013/0161439; and in Publication No. 2013/0161442.

In this embodiment, the leading end of guide tube 16 is secured within sealed liner 42, which retains the spooled consumable filament. The trailing end of guide tube 16 is accordingly secured to universal adapter 18, desirably in a sealed manner. Additionally, consumable assembly 12 in this embodiment also includes handle 43, which may be used to retain guide tube 16 and universal adapter 18, such as during transportation and storage.

As illustrated in FIGS. 2 and 3, universal adapter 18 may be used with a variety of different container portions having supplies of consumable filaments (e.g., part and support material filaments) for use in additive manufacturing systems, such as system 10. For example, in the embodiment shown above in FIG. 2, coil 36 may effectively be any suitable size that does not restrict the payout of the consumable filament. Similarly, in the embodiment shown above in FIG. 3, the spooled filament is effectively limited only to sizes that enable the spool to rotate without undue pulling or drawing forces on the consumable filament. In each embodiment, the consumable filament from container portion 14 is desirably pre-fed through guide tube 16, and into universal adapter 18. This allows the consumable filament to be readily loaded to the additive manufacturing system.

Figure 4A:
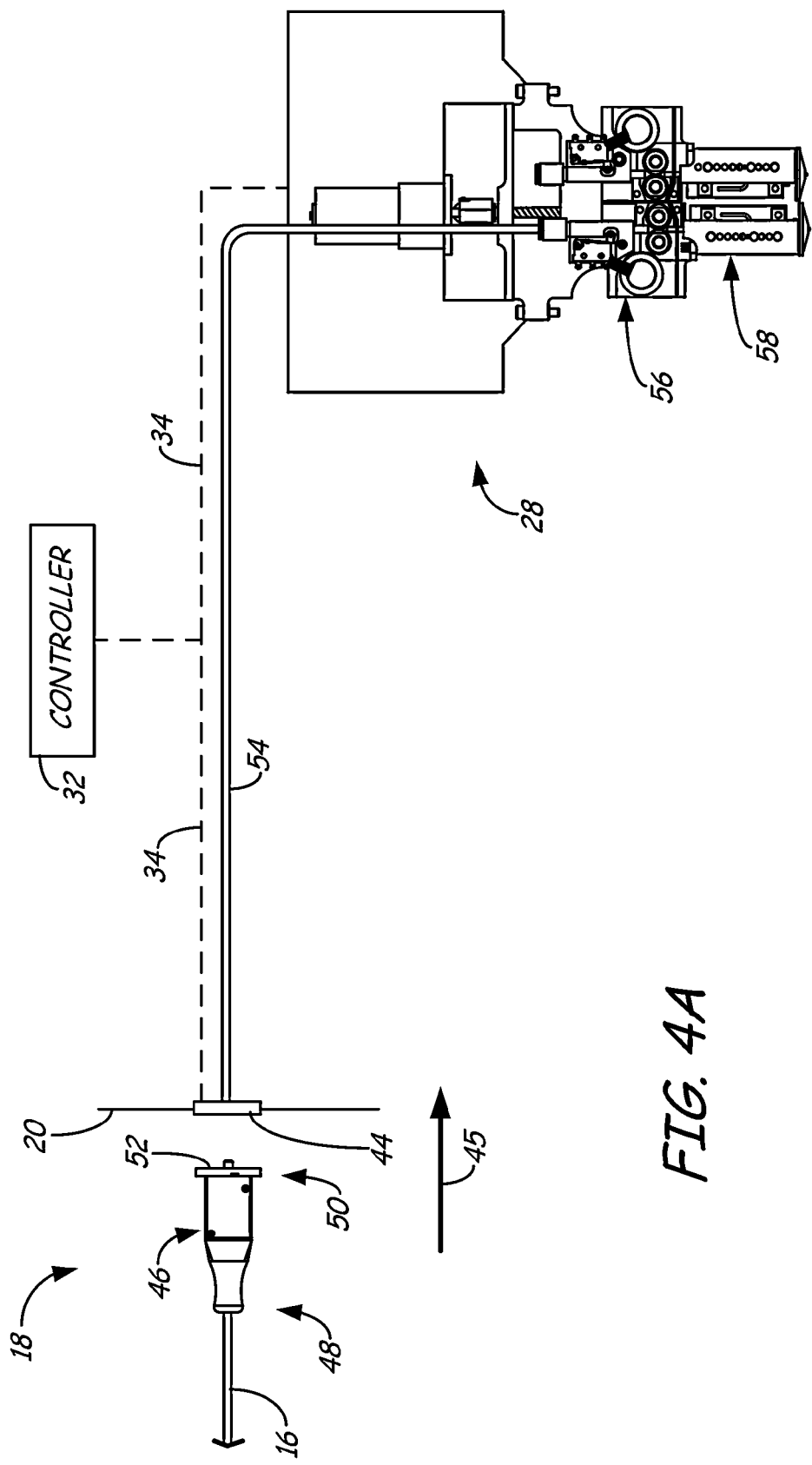
FIGS. 4A and 4B are schematic illustrations of the universal adapter in use with the additive manufacturing system.

As shown in FIG. 4A, prior to operating system 10, universal adapter 18 may interface with a reciprocating mating panel of system 10 (referred to as mating panel 44), as illustrated by arrow 45. Mating panel 44 may be retained at any suitable location on or within system casing 20, and is typically at a remote location from print head 28. For example, mating panel 44 may be retained at an exterior surface of system casing 20, as shown, for convenient access by a user. Alternatively, mating panel 44 may be located in a drive bay of system 10, in which consumable assembly 12 may be loaded. For example, mating panel 44 may be retrofitted into an existing additive manufacturing system, replacing any existing mechanism for engaging existing filament spool cassettes. In a further alternative embodiment, mating panel 44 may be external to system casing 20 and connected to system 10 by an umbilical.

In the shown embodiment, universal adapter 18 includes adapter housing 46 disposed between inlet end 48 and outlet end 50, where guide tube 16 and the consumable filament enter universal adapter 18 at inlet end 48. At outlet end 50, universal adapter 18 also includes connection member 52, which is configured to interface with mating panel 44.

Figure 4B:
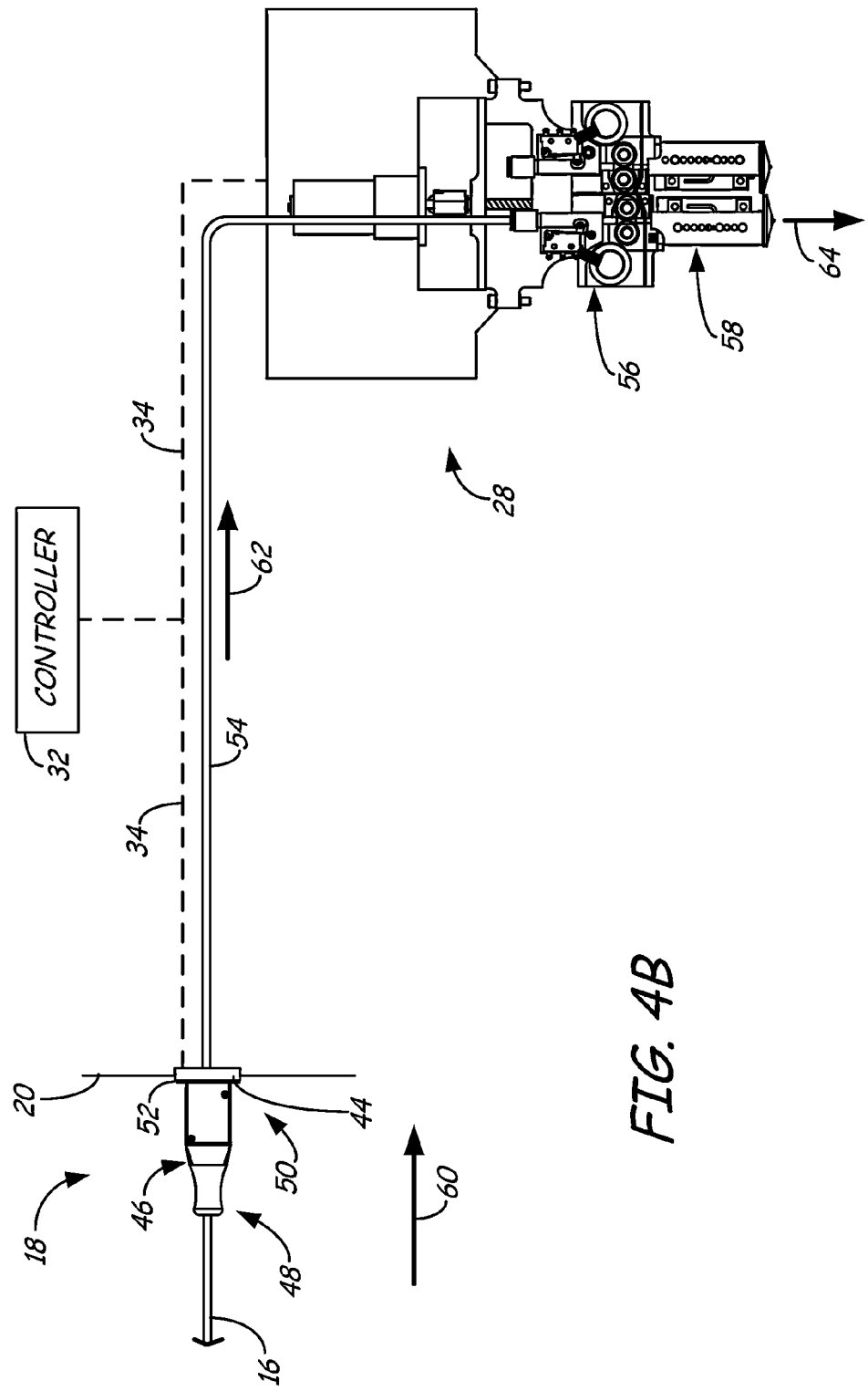

As shown in FIG. 4B, when connection member 52 interfaces with mating panel 44, universal adapter 18 may receive electrical power from system 10, and may communicate with controller 32 over communication line 34. Connection member 52 also provides a link between universal adapter 18 and internal guide tube 54 of system 10, where internal guide tube 54 relays the consumable filament from universal adapter 18 to print head 28. In the shown embodiment, print head 18 includes a second filament drive mechanism 56 and liquefier assembly 58.

During operation, universal adapter 18 draws successive segments of the consumable filament from container portion 14 and through guide tube 16, as illustrated by arrow 60. The drawn segments are then fed through the link between connection member 52 and mating panel 44, and through internal guide tube 54 to print head 28, as illustrated by arrows 62. Upon reaching print head 28, the fed segments then engage drive mechanism 56. Drive mechanism 56 may then continue to draw the segments of the consumable filament into liquefier assembly 58 for melting and extrusion, as illustrated by arrow 64.

In one embodiment, universal adapter 18 may function as an initial feed mechanism to feed the consumable filament to drive mechanism 56 (e.g., for an initial loading operation). When drive mechanism 56 receives the consumable filament, controller 32 may direct a filament drive mechanism retained in universal adapter 18 to disengage from the consumable filament, allowing drive mechanism 56 to continue to freely draw the consumable filament from consumable assembly 12. If the user desires to remove consumable assembly 12, controller 32 may direct universal adapter 18 to re-engage the consumable filament and draw the remaining segments out of print head 28 and internal guide tube 54, and back into consumable assembly 12 for future use (or for recycling of consumable assembly 12).

In a second embodiment, universal adapter 18 may function as an initial feed mechanism to feed the consumable filament to drive mechanism 56, and then work with drive mechanism 56 to feed the successive segments from container portion 14 to liquefier assembly 58. In this embodiment, the filament drive mechanism of universal adapter 18 may remain engaged with the consumable filament. Controller 32 may operate the filament drive mechanism of universal adapter 18 under a steady power output and/or in synchronized coordination with drive mechanism 56.

In a third embodiment, as discussed further below, when interfaced with mating panel 44, a filament drive mechanism of system 10 at mating panel 44 (not shown) may engage the consumable filament in universal adapter 18, and may function as an initial feed mechanism to feed the consumable filament to drive mechanism 56. In this embodiment, universal adapter 18 either does not include a filament drive mechanism, such as disclosed in Taatjes et al., U.S. Pat. No. 7,938,351, or includes a sub-component of the filament drive mechanism (e.g., an engagement wheel), such as disclosed in Swanson et al., U.S. Pat. No. 7,169,337.

In a fourth embodiment, universal adapter 18 may function as the sole filament drive mechanism for system 10. This embodiment precludes the need for drive mechanism 56 retained by print head 28. As such, print head 28 may be effectively reduce to liquefier assembly 58, which can substantially reduce the weight of print head 28. This accordingly reduces the weight that head gantry 30 is required to move around in the x-y plane during printing operations.

Figure 5:
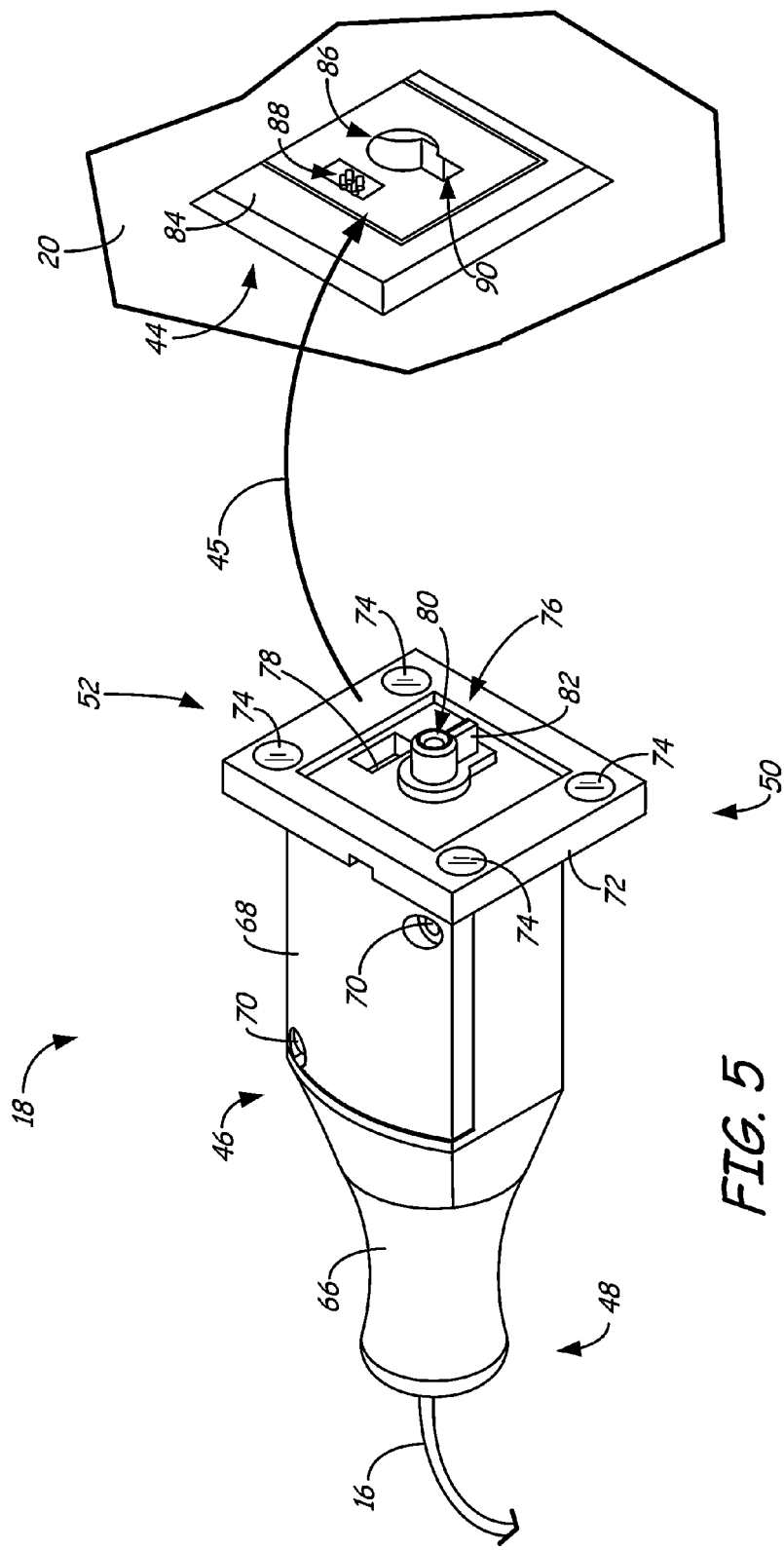
FIG. 5 is a perspective view of the universal adapter and a mating panel of the additive manufacturing system.

As shown in FIG. 5, adapter housing 46 includes handle or grip portion 66 and cover 68. Grip portion 66 is located adjacent to inlet end 48 and provides a convenient location for a user to grip and manipulate universal adapter 18. Cover 68 is secured to the remaining portion of adapter housing 46 with fasteners 70, and provides a sealed access to the internal components of universal adapter 18.

Connection member 52 includes base plate 72, magnets 74, guide tube link 76, and contact pad 78. Base plate 72 is secured to, or is integrally formed with, adapter housing 46 and retains magnets 74 at its corner locations. Magnets 74 are a plurality of magnets used to secure universal adapter 18 to mating panel 44. Guide tube link 76 extends through base plate 72 and includes outlet orifice 80 and alignment tab 82. Outlet orifice 80 is aligned with guide tube 16 for receiving the drawn successive segments of the consumable filament. Contact pad 78 is a first electrical contact (e.g., a control circuit or other circuit board with one or more electrical contacts) for relaying electrical power to the components of universal adapter 18, and for communicating between universal adapter 18 and controller 32.

The control circuit of universal adapter 18 may also include data stored one or more data storage devices (e.g., non-volatile data storage media), where the data may relate to consumable assembly 12, such as the type of consumable filament material, the remaining amount of the consumable filament remaining in consumable assembly 12, security encryption information, hand-shake protocols, printing parameters, and the like. As discussed below, in alternative embodiments, universal adapter 18 may communicate with controller 32 through one or more wireless mechanisms.

Mating panel 44 of system 10 correspondingly includes receiving plate 84, link socket 86, and electrical contact 88. As used herein, the term "panel", with reference to mating panel 44, may be any suitable structure or geometry. Receiving plate 84 is a metallic plate configured to magnetically couple with magnets 74. The magnetic coupling is desirably strong enough to prevent connection member 52 from disengaging from mating panel 44 during a printing operation, while also allowing a user to disengage universal adapter 18 without undue pulling force. In alternative embodiments, universal adapter 18 and mating panel 44 may incorporate alternative coupling mechanisms, such as releasable fasteners (e.g., trigger-actuated fasteners and fasteners releasable by controller 32).

Link socket 86 is an opening to internal guide tube 54 (shown in FIGS. 4A and 4B) that is configured to engage with guide tube link 76 in a sealed manner for transferring the successive segments of the consumable filament from universal adapter 18 to internal guide tube 54. Link socket 86 includes alignment slot 90, which alignment tab 82 of guide tube link 76 may be aligned with and inserted into. This ensures that universal adapter 18 is correctly oriented for proper engagement with mating panel 44.

When universal adapter 18 interfaces with mating panel 44, guide tube link 76 and link socket 86 desirably form a seal against ambient conditions (e.g., a moisture-resistant seal). This maintains the barrier against ambient conditions at all points from container portion 14 to print head 28, which reduces or eliminates the effects of ambient conditions on the consumable filament.

Electrical contact 88 is a second electrical contact (e.g., a circuit board with POGO pins) that is configured to engage with contact pad 78. This allows system 10 to relay electrical power to universal adapter 18, and to relay communications between universal adapter 18 and controller 32 (e.g., via communication line 34). When universal adapter 18 interfaces with mating panel 44, universal adapter 18 may send communications to controller 32, such as information relating to the consumable filament. Similarly, controller 32 may relay electrical power to universal adapter 18, such as to drive the consumable filament through outlet orifice 80, link socket 86, and into internal guide tube 54.

Additionally, as discussed below, universal adapter 18 may include one or more sensors, which may communicate with controller 32 over contact pad 78, electrical contact 88, and communication line 34. For example, as discussed below, universal adapter 18 may include one or more filament detection switches (not shown in FIG. 5), which communicate with controller 32 to identify when consumable assembly 12 has exhausted its supply of the consumable filament.

Figure 6:
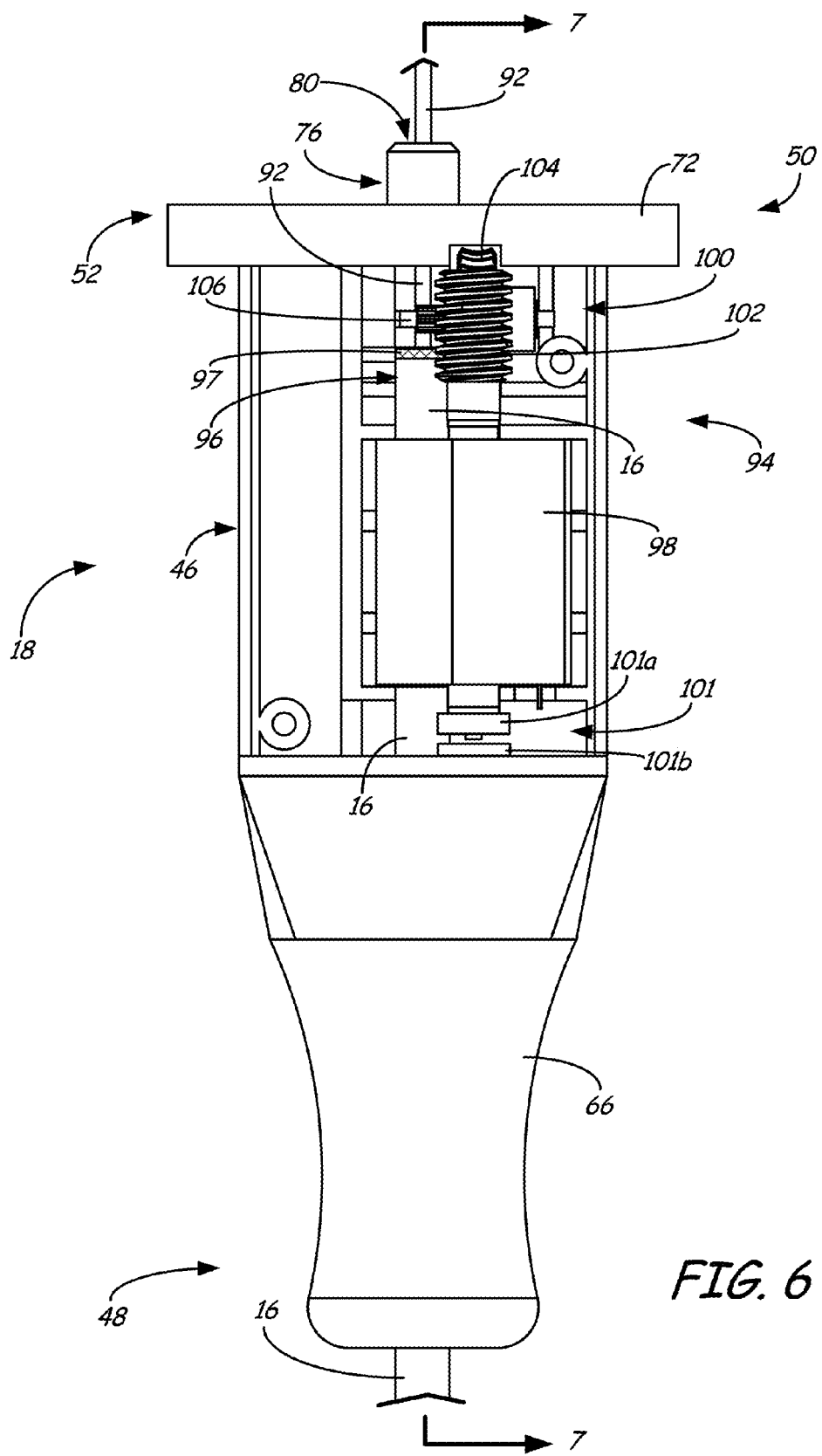
FIG. 6 is a side view of the universal adapter.

FIG. 6 shows universal adapter 18 with cover 68 and fasteners 70 omitted, and with a segment of the consumable filament (referred to as filament 92) extending through guide tube 16 and universal adapter 18. As shown, universal adapter 18 also includes filament drive mechanism 94 engaged with filament 92. In particular, in the shown embodiment, guide tube 16 has a tip or leading end 96 disposed within adapter housing 46 toward outlet end 50, just short of the engagement between filament 92 and filament drive mechanism 94.

This arrangement preserves the barrier against ambient conditions (e.g., moisture barrier). The interior region of adapter housing 18 may also be sealed against ambient conditions (e.g., with gasket seals at cover 68). Furthermore, leading end 96 of guide tube 16 may include wiper seal 97 (illustrated with cross-hatching in FIG. 6 for ease of visibility) at its exit orifice, which encapsulates filament 92 as filament 92 passes out of guide tube 16. This further seals the segments of filament 92 within guide tube 16 and container portion 14 from ambient conditions (e.g., moisture).

Filament drive mechanism 92 includes motor 98, and capstan assembly 100, and encoder assembly 101, where capstan assembly 100 engages and drives successive segments of filament 92 through outlet orifice 80 via rotational power from motor 98. Motor 98 is accordingly connected to contact pad 78 of connection member 52 (shown in FIG. 5) with one or more electrical connections (not shown) to receive electrical power from system 10.

Figure 7:
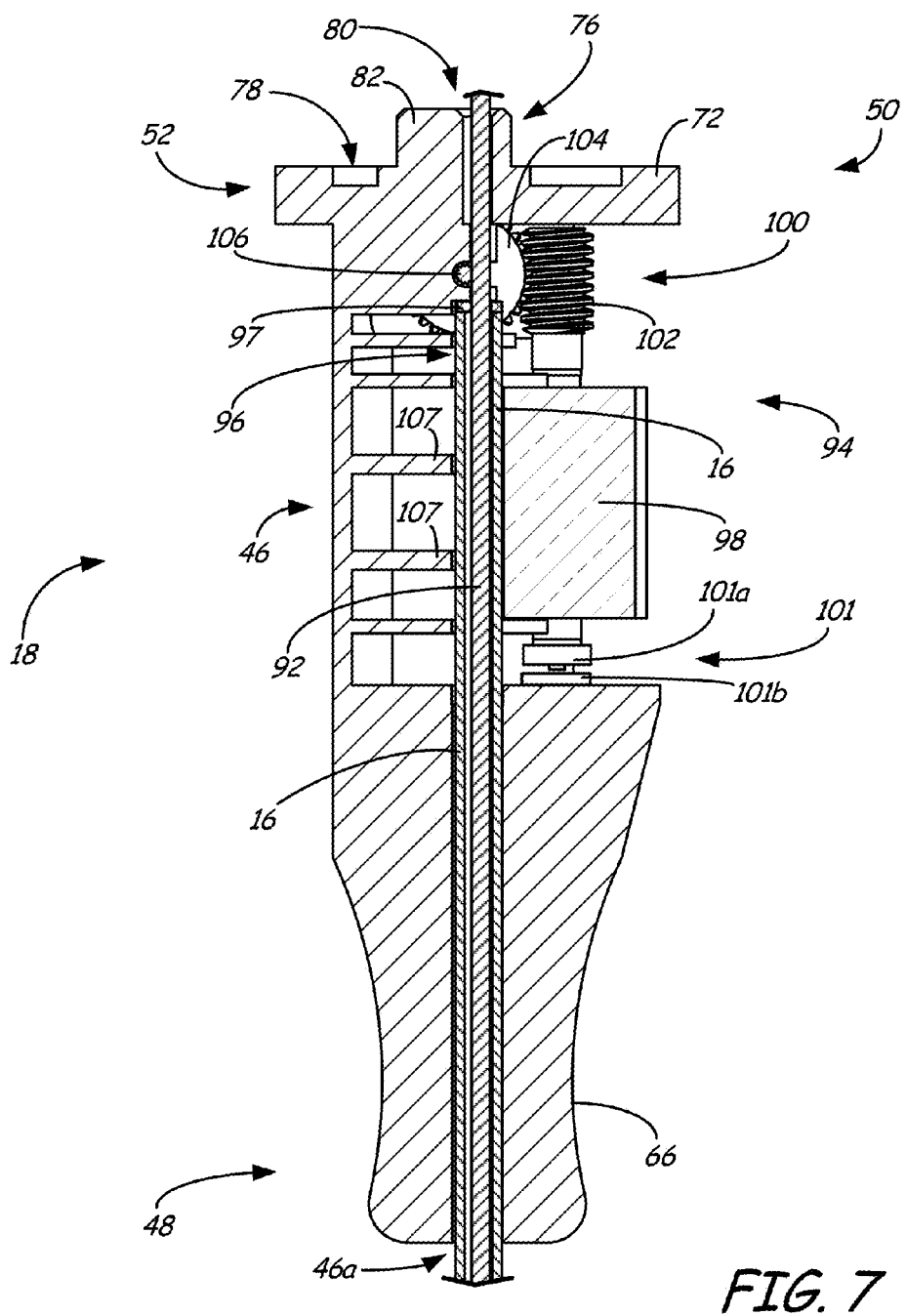
FIG. 7 is a sectional view of the universal adapter, as taken along Section 6-6 in FIG. 5.

Capstan assembly 100 includes screw gear 102, capstan gear 104, and capstan drive shaft 106. Examples of suitable designs for motor 98, capstan assembly 100, and encoder assembly 101 include those disclosed in Swanson et al., U.S. Publication No. 2012/0164256. As shown in FIG. 7, filament drive mechanism 94 is supported in adapter housing 46 by retention walls 107. As further shown, adapter housing 46 include inlet opening 46a through which guide tube 16 and filament 92 extend.

Figure 8:
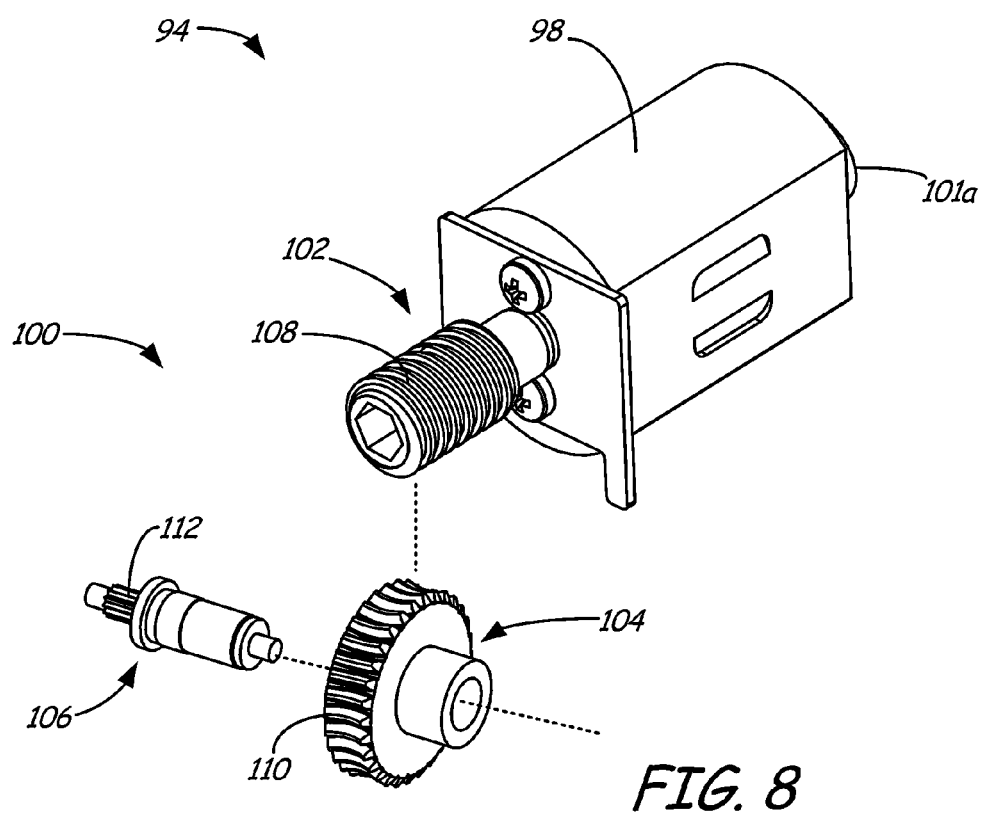
FIG. 8 is an exploded perspective view of a filament drive mechanism of the universal adapter.

As best shown in FIG. 8, screw gear 102 is rotatably secured to motor 98 and includes threaded surface 108 that is engaged with reciprocating teeth 110 of capstan gear 104 to rotate capstan gear 104. The rotation of capstan gear 104 correspondingly rotates capstan drive shaft 106, which is connected to an axial location of capstan gear 104. Capstan drive shaft 106 includes toothed surface 112 that is engaged with the pre-fed filament 92, and the rotation of capstan drive shaft 106 correspondingly drives the successive segments of filament 92 through outlet opening 80. Adapter housing 46 also desirably includes a bearing wall or similar feature (not shown) to support leading end 96 of guide tube 16 and/or filament 92 at the engagement location of filament 92 and capstan drive shaft 106. This allows capstan drive shaft 106 to retain a suitable engagement pressure on filament 92. For example, cover 68 may include an inward extension with a bearing surface to support leading end 96 of guide tube 16.

As previously shown in FIGS. 6 and 7, encoder assembly 101 includes magnet 101a and encoder sensor 101b, where magnet 101a is mounted in close proximity to encoder sensor 101b. Magnet 101a is a rotatable magnet located on the opposing end of motor 98 from screw gear 102, and is also axially connected to motor 98 to rotate with screw gear 102. Magnet 101a and encoder sensor 101b function as an encoder assembly configured to measure the rotation of screw gear 102, where encoder sensor 101b may be electrically connected to contact pad 78 to communicate with controller 32. In particular, encoder sensor 101b is capable of measuring the rotational angle of magnet 101a as magnet 101a rotates with screw gear 102. This arrangement allows the rotational rate and direction of screw gear 102 to be monitored, which corresponds to the rate at which filament 92 is fed through universal adapter 18.

While illustrated with filament drive mechanism 92, universal adapter 18 may alternatively include different types of filament drive mechanisms. For example, universal adapter 18 may include a helical drive, such as disclosed in Batchelder et al., U.S. Pat. No. 7,896,209. Alternatively, capstan drive shaft 106 may extend directly from motor 98 for engagement with filament 92.

Figure 9A:
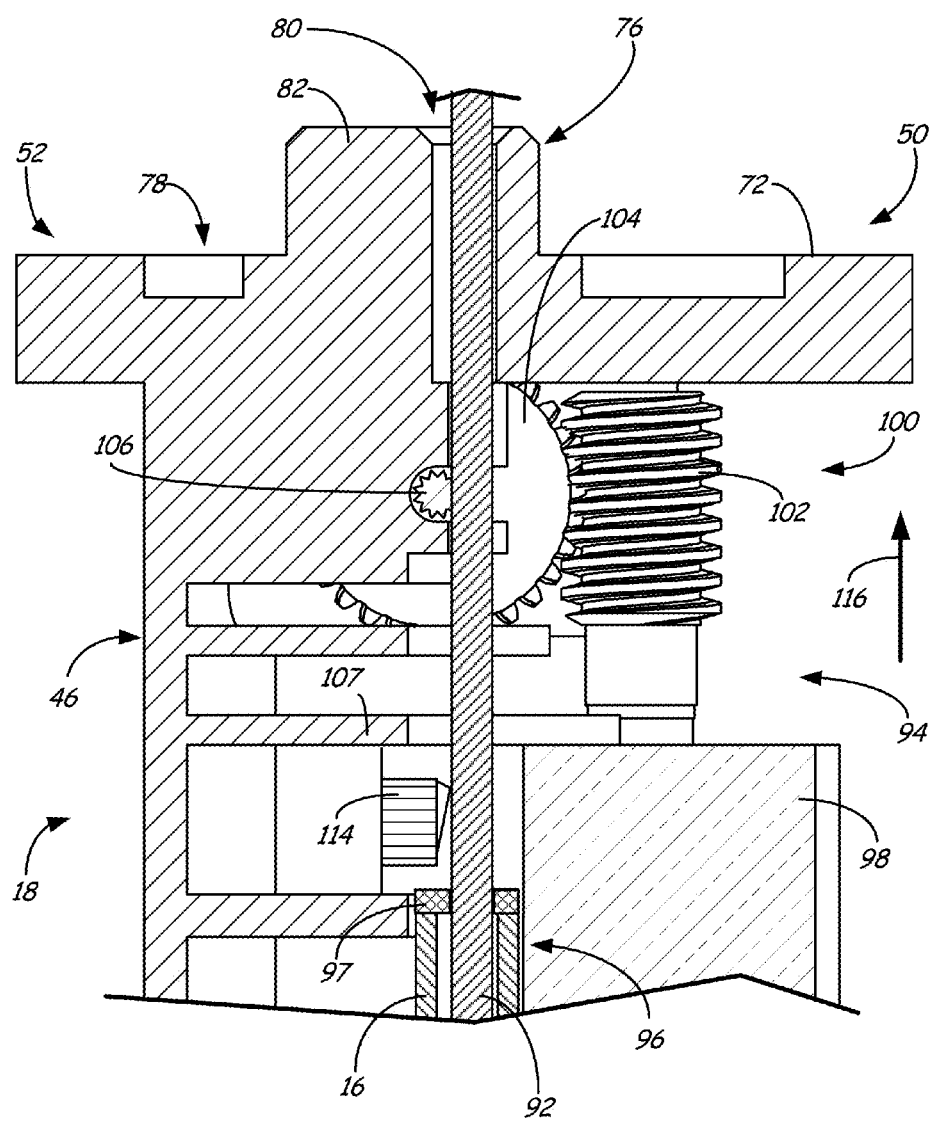
FIG. 9A-9C are expanded sectional views of alternative designs for the universal adapter, which include filament detection switches.
Figure 9B:
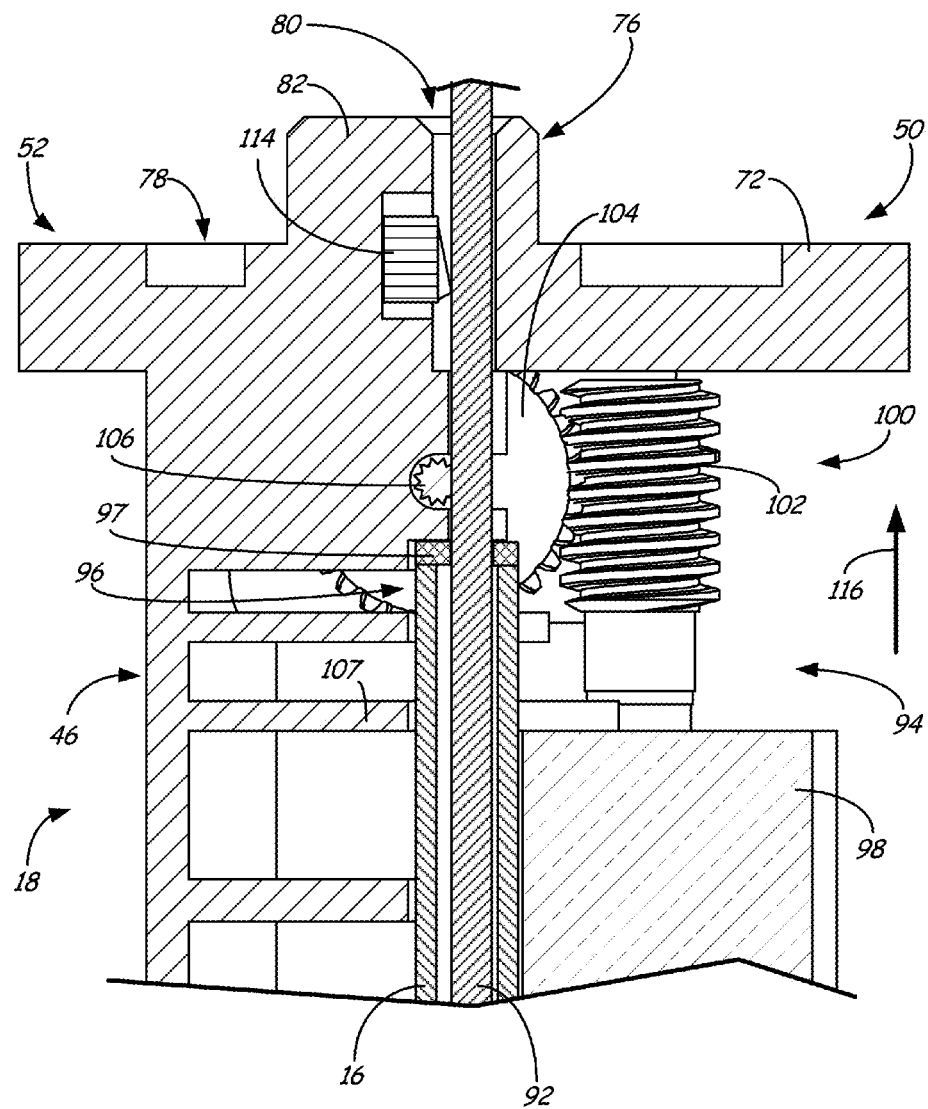
Figure 9C:
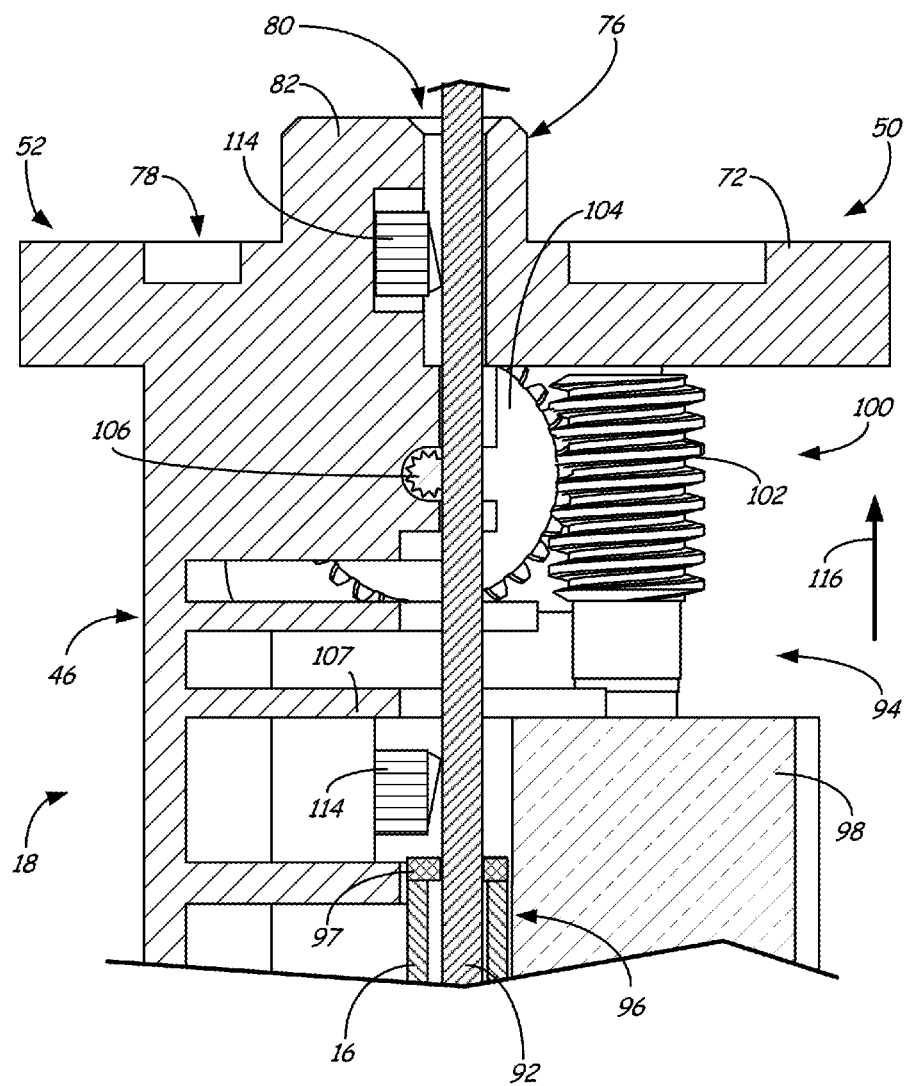

FIGS. 9A-9C illustrate alternative designs for universal adapter 18, which include filament detection switches. As shown in FIG. 9A, universal adapter 18 may include filament detection switch 114, where leading end 96 of guide tube 16 is located upstream from filament detection switch 114. As used herein, the terms "upstream" and "downstream" refer to locations relative to a direction of travel for filament 92 as filament 92 is driven through universal adapter 18 (i.e., in the direction of arrow 116).

Filament detection switch 114 is connected to contact pad 78 of connection member 52 (shown in FIG. 5) with one or more electrical connections (not shown) to relay signals to controller 32 relating to the detected presence of filament 92. Filament detection switch 114 may be at any suitable location along universal adapter 18 for engagement with filament 92. In the shown embodiment, filament detection switch 114 is located upstream from the engagement between filament 92 and capstan drive shaft 106. As discussed in Taatjes et al., U.S. Pat. No. 7,938,351, this allows filament detection switch 114 to identify when the trailing end of filament 92 passes by, prior to the trailing end reaching capstan drive shaft 106.

As soon as filament detection switch 114 detects the lack of any filament (i.e., the trailing end of filament 92 passes downstream from filament detection switch 114), filament detection switch 114 relays a signal to controller 32 (or halts the relay of a signal), and controller 32 may then direct filament drive mechanism 94 to halt further driving of filament 92. Since the trailing end of filament 92 remains engaged with capstan drive shaft 106, controller 32 may then direct filament drive mechanism 94 to draw the remaining portion of filament 92 back out of system 10 and into consumable assembly 12.

Universal adapter 18 may then be removed from mating surface 44 and the empty consumable assembly 12 may be replaced with a new consumable assembly 12. The universal adapter 18 of the new consumable assembly 12 may be engaged with mating panel 44 in the same manner as discussed above for feeding the new filament 92 to system 10. The empty consumable assembly 12 may be recycled or otherwise discarded in an environmentally-friendly manner.

In the embodiment shown in FIG. 9B, filament detection switch 114 is located downstream from the engagement between filament 92 and capstan drive shaft 106, at outlet orifice 80. Alternatively, as shown in FIG. 9C, universal adapter 18 may also include two filament detection switches 114, one upstream and one downstream from the engagement between filament 92 and capstan drive shaft 106, at outlet orifice 80. This embodiment allows universal adapter 18 to detect the absence of the trailing end of filament 92 when filament is being drawn in either direction.

FIG. 10 illustrates an additional alternative design for universal adapter 18, which has leading end 96 of guide tube 16 extending to outlet orifice 80. In this embodiment, leading end 96 includes ported opening 118, which allows capstan drive shaft 106 to engage filament 92 while filament 92 remains within guide tube 16. This further preserves the barrier against ambient conditions for filament 92.

Figure 11:
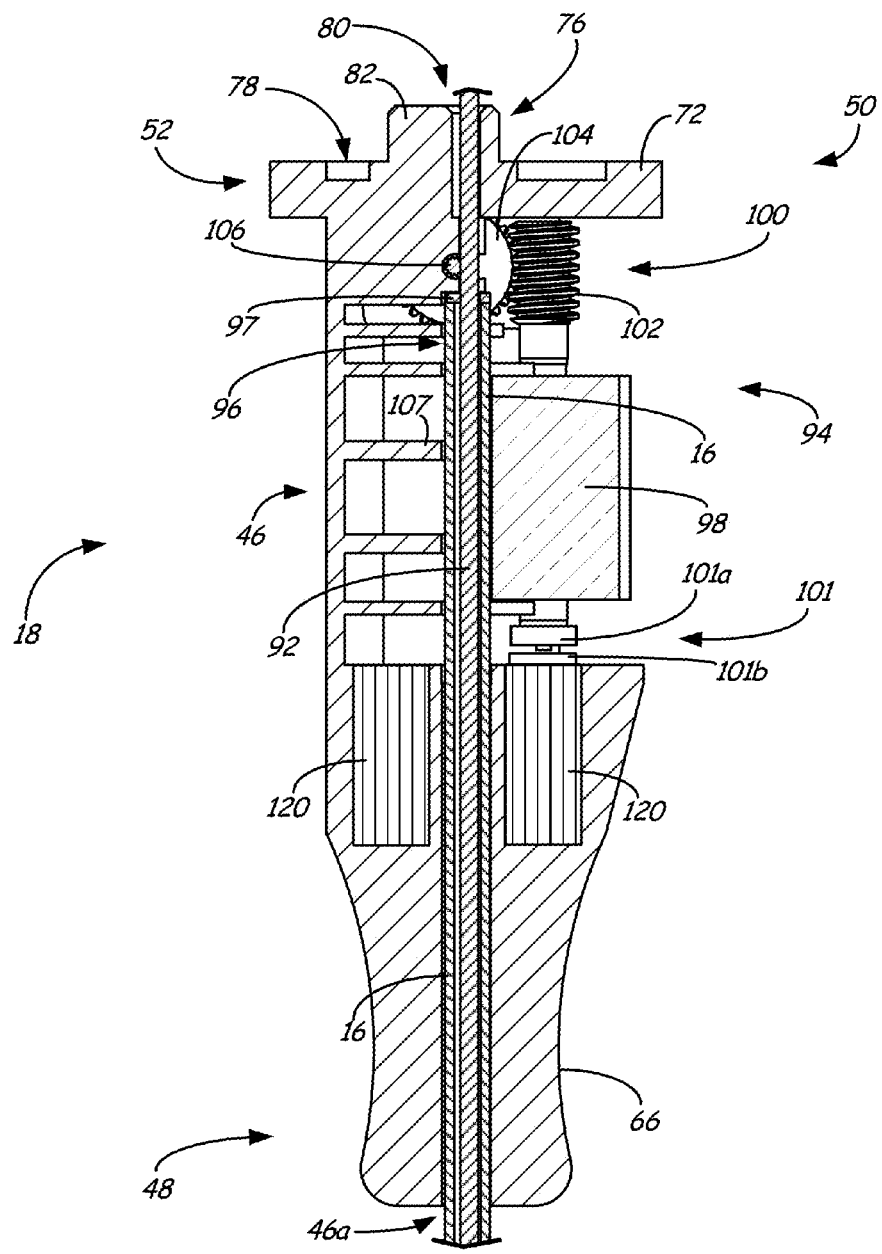
FIG. 11 is a sectional view of a third alternative design for the universal adapter, which includes batteries.

FIG. 11 illustrates another alternative design for universal adapter 18, which may be incorporated into any of the embodiments discussed herein. In this embodiment, universal adapter 18 also includes batteries 120 retained within adapter housing 46 for powering motor 98 and any other suitable component of universal adapter 18. Accordingly, universal adapter 18 may communicate with system 10 over contact pad 78 and electrical contact 88 of mating panel 44. Alternatively, contact pad 78 and/or electrical contact 88 may be omitted, and universal adapter 18 may communicate with system 10 over one or more wireless connections. For example, universal adapter 18 may include a radio-frequency identification (RFID) chip for communicating with system 10.

Figures 12, 13:
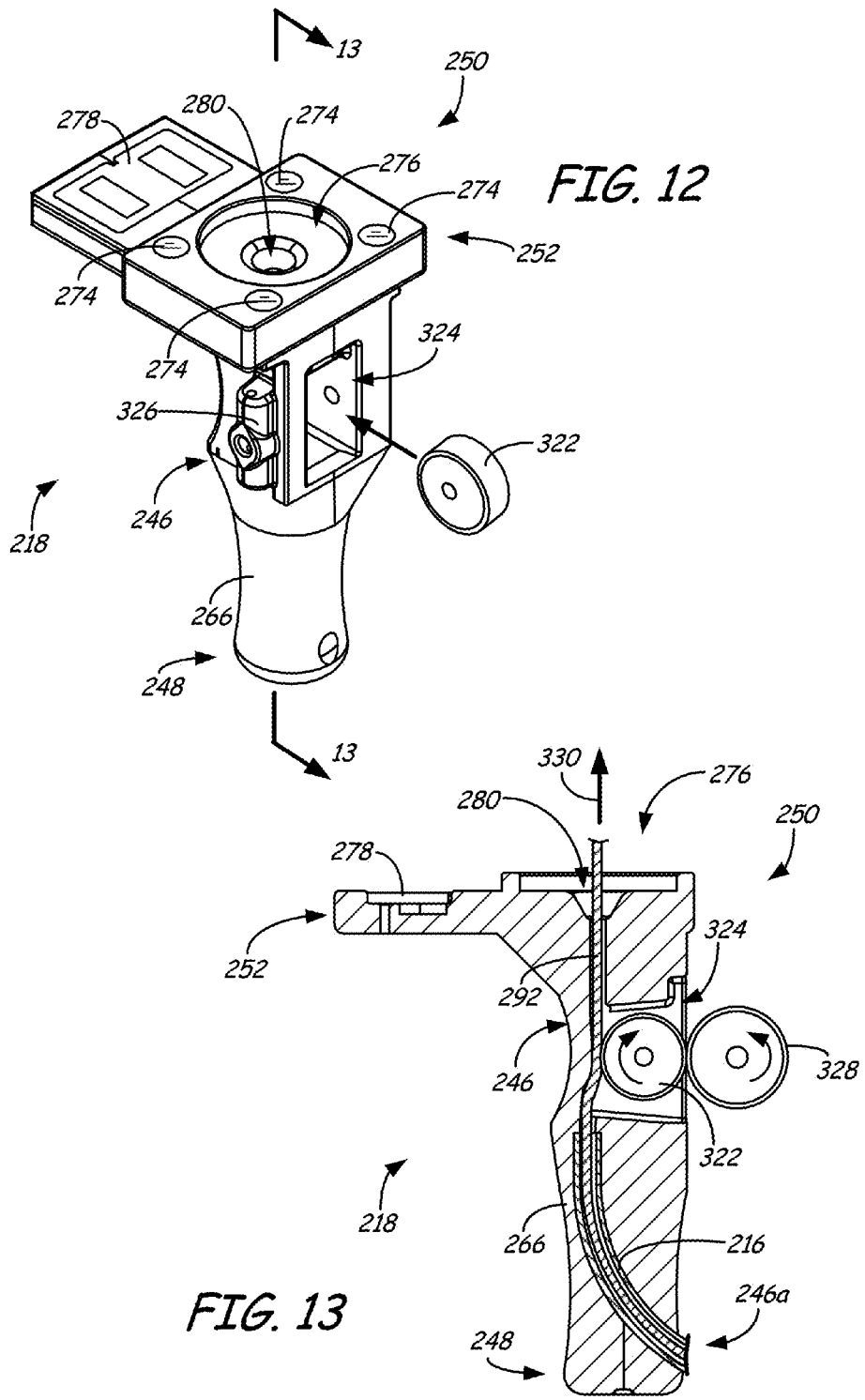
FIG. 12 is a perspective view of an alternative embodiment of the universal adapter, which omits a motor filament drive mechanism.
FIG. 13 is a sectional view of the alternative embodiment of the universal adapter, as taken along Section 13-13 in FIG. 12.

FIGS. 12 and 13 illustrate universal adapter 218, which is an example of a suitable alternative to any of the above-discussed embodiments of universal adapter 18, and where the reference numbers of the corresponding components are increased by "200". Universal adapter 218 is suitable as a retrofitted design for use in existing additive manufacturing systems, and omits a motorized filament drive mechanism. Instead, universal adapter 218 includes engagement wheel 322, which may be retained in opening 324 of adapter housing 246 in suitable manner, such as with a hinged-door (not shown) using hinge support 326, as disclosed in Swanson et al., U.S. Pat. No. 7,169,337.

Engagement wheel 322 is a sub-component of a filament drive mechanism retained by the additive manufacturing system. As such, universal adapter 218 does not include a motorized filament drive mechanism. Instead, when universal adapter 218 interfaces with a reciprocating mating panel of the additive manufacturing system, contact pad 178 engages the electrical contact of the mating panel, allowing the controller of the additive manufacturing system (e.g., controller 32) to detect that universal adapter 218 is connected. The controller may then direct the filament drive mechanism of the system (e.g., system wheel 328) to rotate engagement wheel 322 to drive the successive segments of filament 292 through universal adapter 218 and into the additive manufacturing system, as illustrated by arrow 330. Alternatively, engagement wheel 322 may be manually rotated to feed filament 292 into the additive manufacturing system, for engagement with a filament drive mechanism of the system.

As further shown in FIGS. 12 and 13, inlet opening 46a extends from a lateral side of grip 166 rather than extending downward out of inlet end 48. The lateral extension of inlet opening 46a allows universal adapter 218 to fit within a cassette bay of a retrofitted additive manufacturing system without being guide tube 216 at an extreme angle. Additionally, guide tube link 276 extends inward into connection member 252. In this embodiment, the reciprocating link socket of the mating panel may include a feature that extends into guide tube link 276 to provide a seal against ambient conditions.

As discussed above, universal adapters 18 and 218 each provides a convenient and effective mechanism for delivering successive segments of consumable filaments (e.g., filaments 92 and 292) to additive manufacturing systems (e.g., system 10). This allows the consumable assemblies (e.g., consumable assembly 12) to be easily loadable, removable, and replaceable.

Additionally, universal adapters 18 and 218 may each interchangeably interface with different additive manufacturing systems, each having a reciprocating mating panel. For example, a user may interface a given consumable assembly 12 with a first additive manufacturing system (e.g., a system available under the trademarks "DIMENSION" and "uPRINT" from Stratasys, Inc., Eden Prairie, Minn.) to print a first 3D part. When the printing operation is completed, the user may then disengage the given consumable assembly 12 from the first additive manufacturing system, and interface it with a second additive manufacturing system (e.g., a system available under the trademark "FORTUS" from Stratasys, Inc., Eden Prairie, Minn.) to print a second 3D part. This allows a single consumable assembly (e.g., consumable assembly 12) to be used with different models of additive manufacturing systems.

Suitable consumable filaments for filaments 92 and 292 include those disclosed and listed in Crump et al., U.S. Pat. No. 5,503,785; Lombardi et al., U.S. Pat. Nos. 6,070,107 and 6,228,923; Priedeman et al., U.S. Pat. No. 6,790,403; Comb et al., U.S. Pat. No. 7,122,246; Batchelder, U.S. Patent Application Publication Nos. 2009/0263582, 2011/0076496, 2011/0076495, 2011/0117268, 2011/0121476, and 2011/0233804; and Hopkins et al., U.S. Patent Application Publication No. 2010/0096072. The terms "about" and "substantially" are used herein with respect to measurable values and ranges due to expected variations known to those skilled in the art (e.g., limitations and variabilities in measurements).

EXAMPLES

Figure 14:
FIG. 14 is a photograph of a test set up for a tested coupling adapter of the present disclosure.

The present disclosure is more particularly described in the following examples that are intended as illustrations only, since numerous modifications and variations within the scope of the present disclosure will be apparent to those skilled in the art. FIG. 14 illustrates a test set up for a universal adapter of the present disclosure, which corresponded to universal adapter 218.

As disclosed in U.S. Publication No. 2013/0161432, for each test run, a coil of a consumable filament in a figure-8 configuration was laid flat on its side, as shown. The consumable filaments tested included a 0.070-inch diameter polycarbonate filament, and a 0.070-inch diameter break-away support structure filament, each commercially available from Stratasys, Inc., Eden Prairie, Minn. Various payout tubes were inserted into a payout hole of the coil and a leading end of a guide tube was secured to the payout tube.

The trailing end of the guide tube was connected to the shown universal adapter, which was then interfaced with a reciprocating mating panel of an additive manufacturing system commercially available from Stratasys, Inc., Eden Prairie, Minn. under the trademarks "FDM" and "FORTUS 400mc". The reciprocating mating panel was the standard connection used for a spooled cassette typically used with the additive manufacturing system. During each test, the universal adapter repeatedly drew the consumable filaments from the coil to a print head of the additive manufacturing system. As discussed in the co-filed U.S. patent application, some of the tested payout tubes were the limiting factors in whether the consumable filaments were successfully drawn (due to payout entanglement). Accordingly, the universal adapters of the present disclosure are suitable for engagement with additive manufacturing systems to reliably deliver consumable filaments in a convenient and effective manner.

Although the present disclosure has been described with reference to preferred embodiments, workers skilled in the art will recognize that changes may be made in form and detail without departing from the spirit and scope of the disclosure.

The invention claimed is:

1. A consumable assembly for use with an additive manufacturing system having a print head and a mating panel that is disposed at remote location from a print head, the consumable assembly comprising:
a container portion having a supply of a consumable filament;
a flexible guide tube having a first end disposed in the container portion and a second end; and
a universal adapter that is separate from the container portion, and comprising:
an inlet opening through which the second end of the guide tube extends;
a coupling mechanism configured to secure the universal adapter to the mating panel;
an outlet orifice configured to engage a reciprocating opening of the mating panel; and
a filament drive mechanism engaged with a segment of the consumable filament that is fed from the container portion, through the guide tube, and into the universal adapter, wherein the filament drive mechanism is configured to relay the consumable filament from the outlet orifice of the universal adapter and into the reciprocating opening of the mating panel.

2. The consumable assembly of claim 1, and further comprising a first electrical contact configured to engage a second electrical contact of the mating panel.

3. The consumable assembly of claim 2, wherein the filament drive mechanism is electrically connected to the first electrical contact, and wherein the first electrical contact is configured to relay electrical power from the additive manufacturing system to the filament drive mechanism.

4. The consumable assembly of claim 1, wherein the filament drive mechanism comprises a motor and a capstan drive shaft operably rotated by the motor, wherein the capstan drive shaft is the portion of the filament drive mechanism that is engaged with the segment of the consumable filament.

5. The consumable assembly of claim 1, wherein the universal adapter further comprises an adapter housing, and wherein the filament drive mechanism is retained within the adapter housing.

6. The consumable assembly of claim 1, wherein the supply of the consumable filament is retained in the container portion in a figure-8 coil configuration.

7. The consumable assembly of claim 6, wherein the container portion comprises a liner, and wherein the supply of the consumable filament is disposed within the liner.

8. The consumable assembly of claim 1, wherein the supply of the consumable filament is retained in the container portion in a spooled manner.

9. A consumable assembly for use with an additive manufacturing system having a print head and a mating panel that is disposed at remote location from a print head, the consumable assembly comprising:
   a container portion configured to retain a supply of a consumable filament;
   an adapter that is separate from the container portion, and comprising:
      an adapter housing having an inlet end and an outlet end;
      an inlet opening at the inlet end configured to receive the consumable filament from the container portion;
      a coupling mechanism at the outlet end configured to secure the adapter to the mating panel; and
      an outlet orifice at the outlet end configured to engage a reciprocating opening of the mating panel, and further configured to relay the consumable filament from the adapter and into the reciprocating opening of the mating panel.

10. The consumable assembly of claim 9, and further comprising a flexible guide tube having a first end disposed in the container portion and a second end extending into the inlet opening of the adapter.

11. The consumable assembly of claim 9, wherein the adapter further comprises a filament drive mechanism configured to engage with the consumable filament in the adapter.

12. The consumable assembly of claim 9, wherein the adapter further comprises a first electrical contact at the outlet end configured to engage a second electrical contact of the mating panel.

13. The consumable assembly of claim 9, wherein the supply of the consumable filament is retained in the container portion in a figure-8 coil configuration.

14. A consumable assembly for use with an additive manufacturing system having a print head and a mating panel that is disposed at remote location from a print head, the consumable assembly comprising:
   a consumable filament retained in a figure-8 coil configuration and having a payout hole;
   a payout tube disposed in the payout hole;
   a flexible guide tube having a first end at the payout tube and a second end;
   an adapter comprising:
      an adapter housing having an inlet end and an outlet end;
      an inlet opening at the inlet end, wherein the second end of the guide tube extends into the inlet opening;
      a coupling mechanism at the outlet end configured to secure the adapter to the mating panel; and
      an outlet orifice at the outlet end configured to engage a reciprocating opening of the mating panel, and further configured to relay the consumable filament from the adapter and into the reciprocating opening of the mating panel.

15. The consumable assembly of claim 14, and further comprising a liner, wherein the consumable filament retained in the figure-8 coil configuration and the payout tube are sealed in the liner.

16. The consumable assembly of claim 15, and further comprising a container, wherein the liner, the consumable filament retained in the figure-8 coil configuration, and the payout tube are retained in the container.

17. The consumable assembly of claim 15, and further comprising desiccant retained within the liner.

18. The consumable assembly of claim 14, and further comprising a first electrical contact configured to engage a second electrical contact of the mating panel.

19. The consumable assembly of claim 14, and further comprising a filament drive mechanism engaged with the consumable filament in the universal adapter.

20. The consumable assembly of claim 19, wherein the filament drive mechanism is configured to receive electrical power from the additive manufacturing system.

* * * * *